United States Patent
Sekikawa (10) Patent No.: US 10,002,514 B2
(45) Date of Patent: Jun. 19, 2018

(54) MACHINE TOOL HAVING FUNCTION OF MONITORING SEALING OF CONTROL PANEL

(71) Applicant: FANUC Corporation, Yamanashi (JP)

(72) Inventor: Yuuta Sekikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/394,967

(22) Filed: Dec. 30, 2016

(65) Prior Publication Data

US 2017/0193796 A1 Jul. 6, 2017

(30) Foreign Application Priority Data

Jan. 6, 2016 (JP) ................................ 2016-000868

(51) Int. Cl.
*G08B 21/00* (2006.01)
*G08B 21/20* (2006.01)
*G08B 21/18* (2006.01)
*B23Q 1/00* (2006.01)

(52) U.S. Cl.
CPC ........... *G08B 21/20* (2013.01); *B23Q 1/0045* (2013.01); *G08B 21/187* (2013.01)

(58) Field of Classification Search
CPC .................................................... G08B 21/20
USPC ......................................................... 340/602
See application file for complete search history.

(56) References Cited

U.S. PATENT DOCUMENTS

| 8,690,260 B1* | 4/2014 | Stolarczyk | ............. E21C 27/02 299/1.1 |
| 9,513,271 B2* | 12/2016 | Okumura | |
| 2006/0025897 A1* | 2/2006 | Shostak | ............... B60C 23/005 701/1 |
| 2008/0252471 A1* | 10/2008 | Ford | ...................... G08B 21/20 340/605 |
| 2012/0083030 A1* | 4/2012 | Busujima | ............... C12M 41/14 435/303.1 |
| 2013/0062047 A1* | 3/2013 | Vaney | ................ H05K 7/20836 165/287 |
| 2014/0063759 A1 | 3/2014 | Honda | |
| 2015/0123984 A1* | 5/2015 | Kim | ......................... G01K 1/20 345/589 |

(Continued)

FOREIGN PATENT DOCUMENTS

JP 62-189596 A 8/1987
JP H10153515 A 6/1998
(Continued)

OTHER PUBLICATIONS

Office Action in JP Application No. 2016-000868, dated Nov. 28, 2017, 6 pp.

*Primary Examiner* — Santiago Garcia
(74) *Attorney, Agent, or Firm* — Hauptman Ham, LLP (57) ABSTRACT

A machine tool has the function of monitoring the sealing performance of a control panel. The machine tool measures temperature and humidity inside the control panel, calculates a vapor amount from the measured results, and stores the vapor amount. A vapor amount change ratio is calculated based on a currently calculated vapor amount and a previously calculated and stored vapor amount. An alert is announced when the calculated vapor amount change ratio is greater than or equal to a specific value.

5 Claims, 5 Drawing Sheets

(56) References Cited

U.S. PATENT DOCUMENTS

2016/0089758 A1* 3/2016 Fujimoto ............. G05B 19/414
                                                                         700/180
2016/0143595 A1* 5/2016 Yoshida ............... A61B 5/7275
                                                                         600/306

FOREIGN PATENT DOCUMENTS

| JP | 11-248592 A    | 9/1999 |
|----|----------------|--------|
| JP | 2003240666 A   | 8/2003 |
| JP | 2005-61888 A   | 3/2005 |
| JP | 2005-230258 A  | 9/2005 |
| JP | 2014-46432 A   | 3/2014 |

\* cited by examiner

MACHINE TOOL HAVING FUNCTION OF MONITORING SEALING OF CONTROL PANEL

RELATED APPLICATIONS

The present application claims priority to Japanese Patent Application Number 2016-000868, filed Jan. 6, 2016, the disclosure of which is hereby incorporated by reference herein in its entirety.

BACKGROUND OF THE INVENTION

1. Field of the Invention

The present invention relates to a technology for monitoring the sealing performance of a control panel of a machine tool.

2. Description of the Related Art

Generally, machine tools are placed under adverse surrounding environments (cutting fluid mist, dust, fine particles, or the like). Since electrical components such as breakers and integrated circuits are mounted in the control panels of the machine tools, the control panels need to protect the electrical components from the surrounding environments.

In many cases, the control panels of machine tools employ sealing structures using packing or sealing. However, there is a likelihood that the sealing performance of the control panels is impaired due to aged deterioration, modifications for upgrading the control panels (placement of jigs or peripheral devices), or the like.

Conventionally, as methods for confirming the sealing performance of control panels, there have been known a method in which visual confirmation is performed when a door is opened and a method in which a vapor amount or absolute humidity is calculated from temperature and humidity data. Japanese Patent Application Laid-open No. 10-153515 describes a technology in which temperature and humidity inside a sealing container are measured by sensors to calculate a vapor amount as an amount that does not depend on temperature and the calculated vapor amount is compared with a reference amount to detect the sealing performance of the container.

In addition, Japanese Patent Application Laid-open No. 2003-240666 describes a technology in which temperature and humidity inside and outside the panel of a housing are measured and the difference between a vapor amount inside the panel and a vapor amount outside the panel is monitored to detect the sealing performance of the housing.

However, it is not possible to quantitatively determine the sealing performance with the visual confirmation. Further, according to the technology described in Japanese Patent Application Laid-open No. 10-153515, a sensitivity for determining sealing is made different or the determination of the sealing becomes impossible depending on seasons at which a sealing state is produced since a vapor amount is large in summer and small in winter. In addition, since the technology employs a method in which a calculated vapor amount is compared with a reference amount, a vapor amount inside a panel becomes equal to a vapor amount outside the panel when the control panel of a machine tool is opened for maintenance or the like, which results in a false determination that the sealing performance has been impaired. That is, it is not possible to distinguish a case in which the door of the control panel has been opened from a case in which the sealing performance has been impaired due to any other reasons.

Further, since the technology described in Japanese Patent Application Laid-open No. 2003-240666 needs a temperature sensor and a humidity sensor outside the panel, it is costly and needs places to install the sensors. In addition, since the technology employs a method in which a vapor amount inside the panel is compared with a vapor amount outside the panel, it is falsely determined, as in the technology described in Japanese Patent Application Laid-open No. 10-153515, that the sealing performance has been impaired when the door of the control panel of the machine tool is opened/closed for maintenance or the like and a vapor amount inside the panel becomes equal to a vapor amount outside the panel.

SUMMARY OF THE INVENTION

The present invention has been made in order to solve the above problems and has an object of providing a machine tool capable of easily and accurately monitoring the sealing state of a control panel.

An embodiment of the present invention provides a machine tool including: a control panel; a temperature sensor and a humidity sensor that measure temperature and humidity inside the control panel, respectively; a vapor amount calculation unit that calculates a vapor amount based on the temperature and the humidity; a vapor amount storage unit that stores the vapor amount; a vapor amount change ratio calculation unit that calculates a vapor amount change ratio based on the vapor amount calculated by the vapor amount calculation unit and the vapor amount stored in the vapor amount storage unit; a vapor amount change ratio threshold setting unit that retains a threshold that is set in advance; a vapor amount change ratio comparison unit that determines whether or not the vapor amount change ratio is greater than or equal to the threshold; and an alert announcement unit that announces an alert when the vapor amount change ratio is greater than or equal to the threshold.

The vapor amount change ratio calculation unit may calculate the vapor amount change ratio using an average of the vapor amounts per prescribed time instead of the vapor amounts.

The machine tool may further include: a door opening/closing detection unit that detects whether a door of the control panel is opened; and a vapor amount resetting unit that temporarily stops the operation of the vapor amount calculation unit to reset a content stored in the vapor amount storage unit when the opening of the door is detected.

The machine tool may further include a power supply monitoring unit that detects whether a power supply of the machine tool is turned ON/OFF, wherein the operation of the vapor amount calculation unit may be stopped for a prescribed time when the power supply monitoring unit detects ON/OFF of the power supply.

According to an embodiment of the present invention, it is possible to provide a machine tool capable of easily and accurately monitoring the sealing state of a control panel.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

First, a description will be given, with reference to FIGS. 1 to 3, of a machine tool according to a first embodiment of the present invention.

Figure 1:
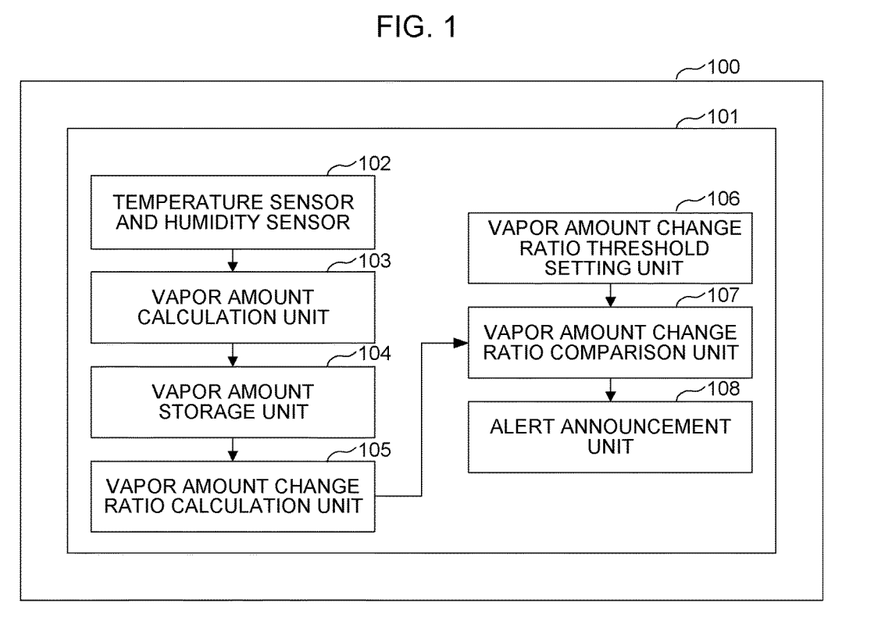
FIG. 1 is a block diagram showing the function configuration of a machine tool according to a first embodiment of the present invention.

FIG. 1 is a block diagram showing the function configuration of the machine tool.

A machine tool 100 has a control panel 101, a temperature sensor and a humidity sensor 102, a vapor amount calculation unit 103, a vapor amount storage unit 104, a vapor amount change ratio calculation unit 105, a vapor amount change ratio threshold setting unit 106, a vapor amount change ratio comparison unit 107, and an alert announcement unit 108. The temperature sensor and the humidity sensor 102 may be replaced by a temperature and humidity sensor capable of measuring both temperature and humidity.

Figure 2:
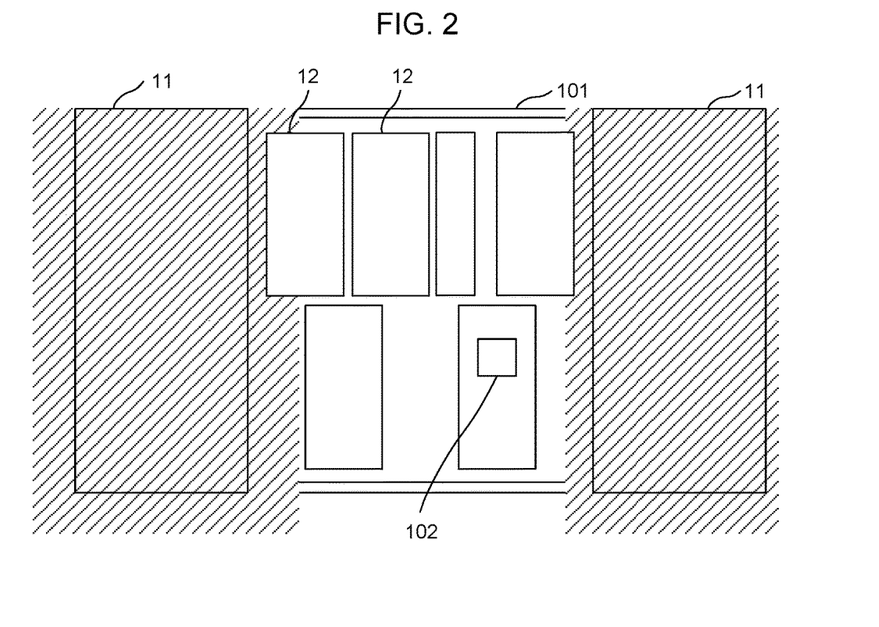
FIG. 2 is a diagram showing the hardware configuration of a control panel in the machine tool of FIG. 1.
Figure 3:
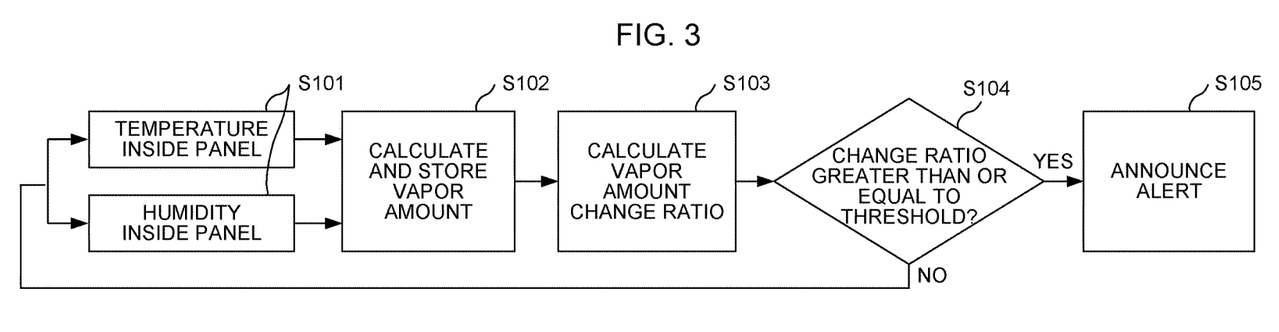
FIG. 3 is a flowchart for describing the operation of the machine tool of FIG. 1.

FIG. 2 is a diagram showing the hardware configuration of the control panel 101 in the machine tool 100 of FIG. 1.

The control panel 101 is a housing for protecting the electrical components of the machine tool 100 from an external atmosphere. The present invention is directed at monitoring the sealing performance of the control panel 101.

The temperature sensor and the humidity sensor 102 are provided inside the control panel 101 and measure temperature and humidity inside the panel, respectively. The temperature sensor and the humidity sensor 102 output measurement results to the vapor amount calculation unit 103.

Note that in FIG. 2, reference numeral 11 denotes the door of the control panel 101 and reference numeral 12 denotes an electrical component provided in the control panel 101.

The vapor amount calculation unit 103, the vapor amount storage unit 104, the vapor amount change ratio calculation unit 105, the vapor amount change ratio threshold setting unit 106, the vapor amount change ratio comparison unit 107, and the alert announcement unit 108 are logical processing units that realize a prescribed function when a central processing unit (CPU) (not shown) performs processing defined in a program and controls a storage device, an input/output device, or the like. Typically, these processing units are realized by a numerical controller or a micro computer.

The vapor amount calculation unit 103 performs processing to calculate a vapor amount based on measurement results by the temperature sensor and the humidity sensor 102. Typically, the vapor amount calculation unit 103 repeatedly calculates a vapor amount at regular time intervals.

The vapor amount storage unit 104 stores a vapor amount calculated by the vapor amount calculation unit 103. The vapor amount storage unit 104 may store at least one past calculation result of a vapor amount and update the stored content with a new value when the vapor amount calculation unit 103 newly calculates the vapor amount. Alternatively, the vapor amount storage unit 104 may successively accumulate any number of the calculation results of vapor amounts.

The vapor amount change ratio calculation unit 105 performs processing to calculate a vapor amount change ratio based on a vapor amount stored in the vapor amount storage unit 104 and a vapor amount calculated by the vapor amount calculation unit 103. The vapor amount change ratio threshold setting unit 106 receives the setting of a threshold for a vapor amount change ratio and retains the threshold. The vapor amount change ratio comparison unit 107 performs processing to compare a vapor amount change ratio calculated by the vapor amount change ratio calculation unit 105 with a threshold set in the vapor amount change ratio threshold setting unit 106.

The alert announcement unit 108 performs processing to announce an alert when a vapor amount change ratio calculated by the vapor amount change ratio calculation unit 105 is greater than a threshold set in the vapor amount change ratio threshold setting unit 106. Typically, the alert announcement unit 108 announces an alert by sound, light, a display of an alert message on a screen, or the like.

A description will be given, with reference to the flowchart of FIG. 3, of the operation of the machine tool 100 according to the embodiment.

The temperature sensor and the humidity sensor 102 measure temperature and humidity inside the control panel 101, respectively (step S101). Then, the vapor amount calculation unit 103 calculates a vapor amount based on the temperature and the humidity measured by the temperature sensor and the humidity sensor 102 (step S102).

A saturated vapor pressure E(t) (hPa) is calculated by the following formula (1) using Tetens formula.

$$E(t) = 6.11 \times 10^{\frac{7.5 \times t}{(t+237.3)}} \quad (1)$$

Here, t represents temperature (° C.).

In addition, a saturated vapor amount a(t) (g/m³) is calculated by the following formula (2) using a saturated vapor pressure E(t).

$$a(t) = 217 \times \frac{E(t)}{(t+273.15)} \quad (2)$$

A vapor amount (g/m³) is calculated by the following formula (3) using a saturated vapor amount a(t).

$$\text{Vapor amount} = a(t) \times \frac{rh}{100} \quad (3)$$

Here, rh represents relative humidity (%).

The vapor amount change ratio calculation unit 105 calculates a vapor amount change ratio based on a vapor amount stored in the vapor amount storage unit 104 and the vapor amount calculated by the vapor amount calculation unit 103 (step S103). The vapor amount change ratio (%) may be calculated by the following formula.

$$\text{Vapor amount change ratio}(n) = \frac{|\text{vapor amount}(n) - \text{vapor amount}(n-1)|}{\text{vapor amount}(n)} \times 100 \quad (4)$$

Here, "vapor amount (n)" represents a vapor amount calculated by the vapor amount calculation unit 103, and "vapor amount (n−1)" represents a past vapor amount stored in the vapor amount storage unit 104. Alternatively, each of "vapor amount (n)" and "vapor amount (n−1)" may represent, for example, an average of vapor amounts per prescribed time or a value obtained through a low-pass filter.

Next, the vapor amount change ratio comparison unit 107 refers to the vapor amount change ratio threshold setting unit 106 and acquires a threshold that is set in advance. The threshold represents a value used to determine the impairment of the sealing state of the control panel 101 based on what percent of a vapor amount change ratio has been exceeded.

Figure 7:
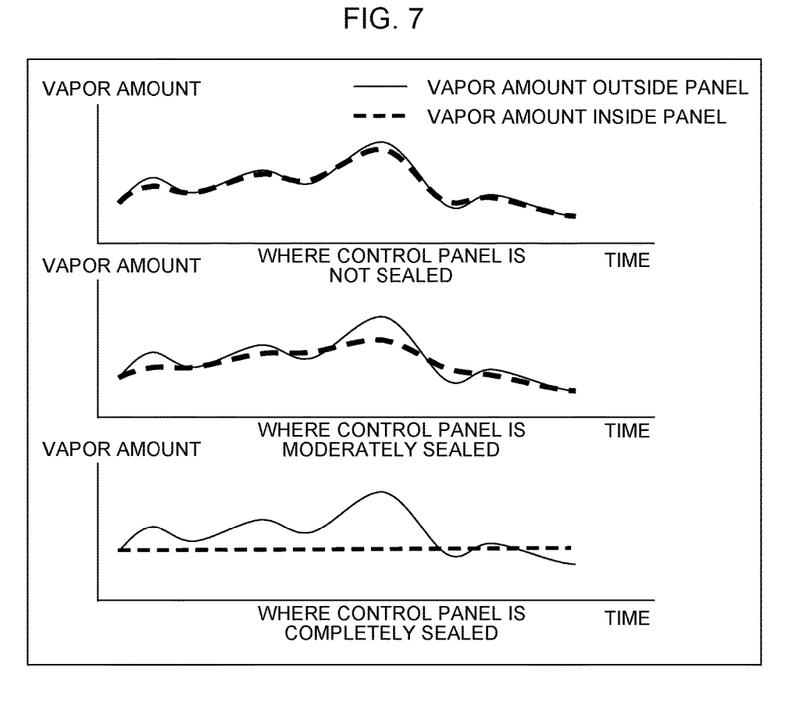
FIG. 7 is a diagram for describing the fact that the degree to which a vapor amount inside the panel follows a change in a vapor amount outside the panel is different according to the sealing degree of the control panel.

As shown in FIG. 7, in a case in which the sealing performance of the control panel 101 has been maintained, a vapor amount inside the panel does not follow a change in a vapor amount outside the panel. In this case, a vapor amount change ratio falls within a specific range. The above threshold defines the specific range. In a case in which the sealing performance of the control panel 101 has been impaired, on the other hand, a vapor amount inside the panel follows a change in a vapor amount outside the panel. In this case, a vapor amount change ratio becomes great and deviates from the above threshold. The vapor amount change ratio comparison unit 107 determines the sealing state of the control panel 101 based on such a tendency of a vapor amount change ratio.

The vapor amount change ratio comparison unit 107 compares the vapor amount change ratio calculated by the vapor amount change ratio calculation unit 105 with a threshold set in the vapor amount change ratio threshold setting unit 106. When the vapor amount change ratio is greater than or equal to the threshold, it is determined that the sealing performance of the control panel 101 has been impaired (step S104).

When it is determined by the vapor amount change ratio comparison unit 107 that the sealing performance of the control panel 101 has been impaired, the alert announcement unit 108 announces an alert (step S105). In order to announce the alert, any resort including sound, light, and a display of a message on a screen may be employed.

According to the embodiment, the vapor amount change ratio comparison unit 107 determines whether the sealing performance of the control panel 101 has been maintained based on a vapor amount change ratio inside the control panel 101. Thus, it is possible to perform an accurate determination without suffering from an ambient vapor amount at a time at which the sealing state of the control panel is produced.

In addition, according to the embodiment, the vapor amount change ratio comparison unit 107 determines whether the sealing performance of the control panel 101 has been maintained only with data acquired by the temperature sensor and the humidity sensor 102 arranged inside the control panel 101. Thus, it is unnecessary to arrange a sensor outside the panel and possible to perform a determination easily and at low cost.

Figure 5:
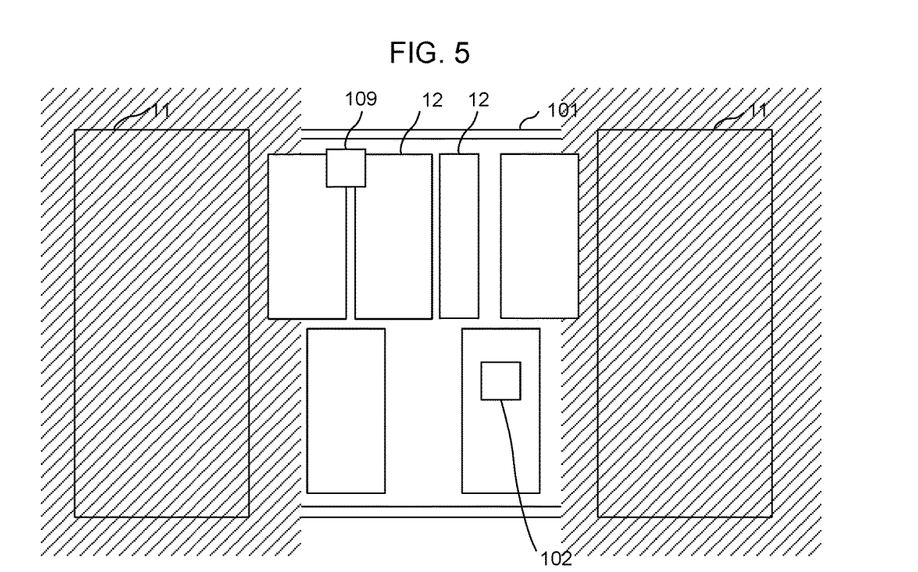
FIG. 5 is a diagram showing the hardware configuration of a control panel in the machine tool of FIG. 4.
Figure 6:
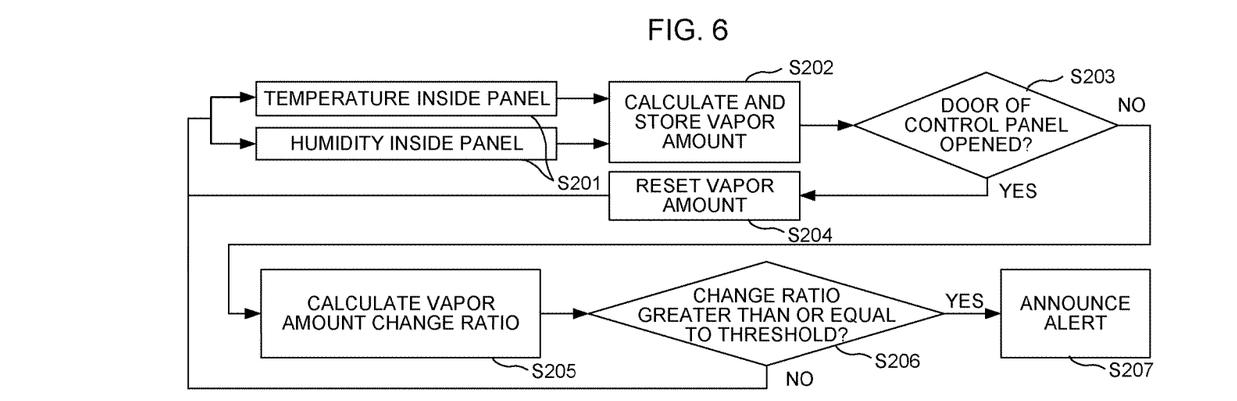
FIG. 6 is a flowchart for describing the operation of the machine tool of FIG. 4.

Next, a description will be given, with reference to FIGS. 4 to 6, of a machine tool according to a second embodiment of the present invention.

According to the machine tool of the embodiment, it is possible to prevent the announcement of an alert due to a false determination that the sealing state of a control panel has been impaired since the opening/closing of a door for maintenance or the like.

Figure 4:
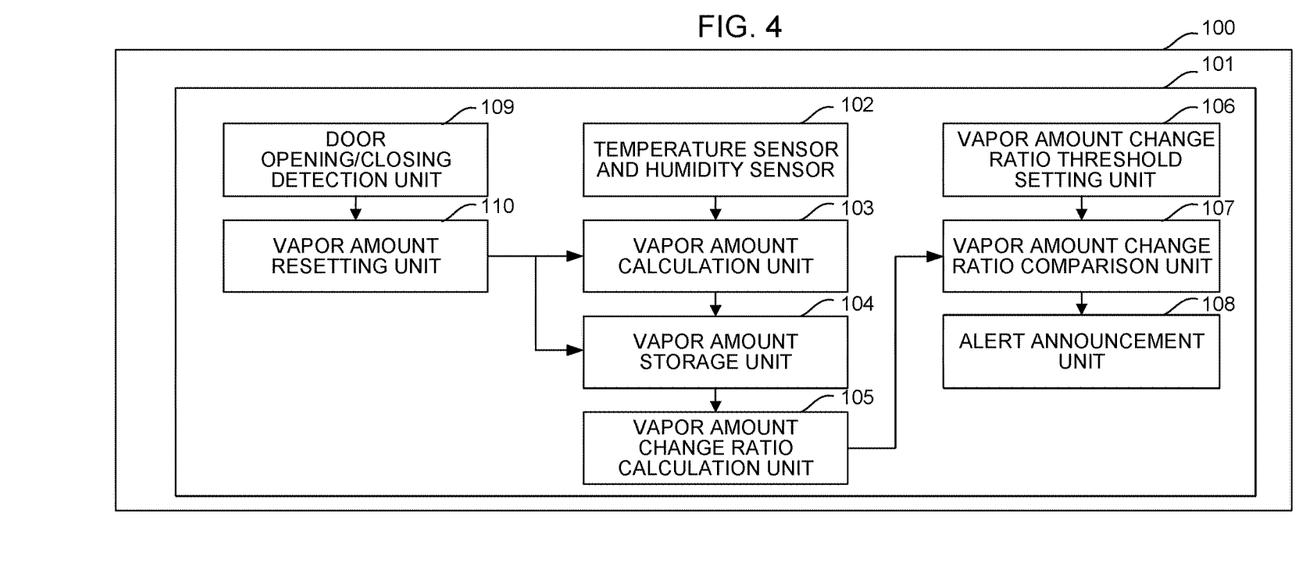
FIG. 4 is a block diagram showing the function configuration of a machine tool according to a second embodiment of the present invention.

FIG. 4 is a block diagram showing the function configuration of the machine tool according to the embodiment. In addition, FIG. 5 is a block diagram showing the hardware configuration of the machine tool of FIG. 4.

The distinctive feature of the embodiment is that a machine tool 100 has a door opening/closing detection unit 109 and a vapor amount resetting unit 110, and the remaining configurations of the machine tool 100 of the embodiment are the same as those of the first embodiment (FIG. 1).

The door opening/closing detection unit 109 detects whether the door of a control panel 101 has been opened/closed with a door opening/closing sensor. The vapor amount resetting unit 110 resets a vapor amount calculation unit 103 and a vapor amount storage unit 104 when the door opening/closing detection unit 109 detects that the door has been opened. That is, the vapor amount resetting unit 110 stops the calculation of a vapor amount inside the panel by the vapor amount calculation unit 103 and deletes data on a vapor amount stored in the vapor amount storage unit 104.

A description will be given, with reference to the flowchart of FIG. 6, of the operation of the machine tool 100 according to the embodiment.

As in the first embodiment, a temperature sensor and a humidity sensor 102 measure temperature and humidity inside the control panel 101, respectively (step S201), and then the vapor amount calculation unit 103 calculates a vapor amount based on the measured temperature and the humidity (step S202).

When the door opening/closing detection unit 109 detects that the door of the control panel 101 has been opened with the door opening/closing sensor (step S203), the vapor amount resetting unit 110 resets the vapor amount calculation unit 103 and the vapor amount storage unit 104 (step S204).

On the other hand, when the door opening/closing detection unit 109 does not detect that the door of the control panel 101 has been opened (step S203), a vapor amount change ratio calculation unit 105 calculates a vapor amount change ratio as in the first embodiment (step S205). Then, a vapor amount change ratio comparison unit 107 determines whether or not the calculated vapor amount change ratio is greater than or equal to a threshold that is set in advance (step S206). When the calculated vapor amount change ratio is greater than or equal to the threshold, an alert announcement unit 108 announces an alert (step S207).

Here, when a vapor amount is reset in step S204 since the door of the control panel 101 has been opened, both the operation of the vapor amount change ratio calculation unit 105 and the operation of the vapor amount change ratio comparison unit 107 are temporarily stopped. Thus, since it is not determined that the sealing state of the control panel 101 has been impaired, the announcement of an alert is prevented.

According to the embodiment, the vapor amount resetting unit 110 resets the vapor amount calculation unit 103 and the vapor amount storage unit 104 to stop the calculation of a vapor amount as in FIG. 4 when the door opening/closing detection unit 109 detects that the door of the control panel 101 has been opened. Thus, since it is possible to distinguish a case in which the door has been opened from a case in which the sealing state has been impaired due to any other reasons, a false determination is prevented.

Next, a description will be given, with reference to FIGS. 8 and 9, of a machine tool according to a third embodiment of the present invention.

According to the machine tool of the embodiment, it is possible to prevent a false determination that a sealing state has been impaired due to fluctuations in the calculated value of a vapor amount when the heating of electrical components inside a panel becomes transient and temperature and humidity inside the panel also become transient at the time of turning ON/OFF a power supply.

Figure 8:
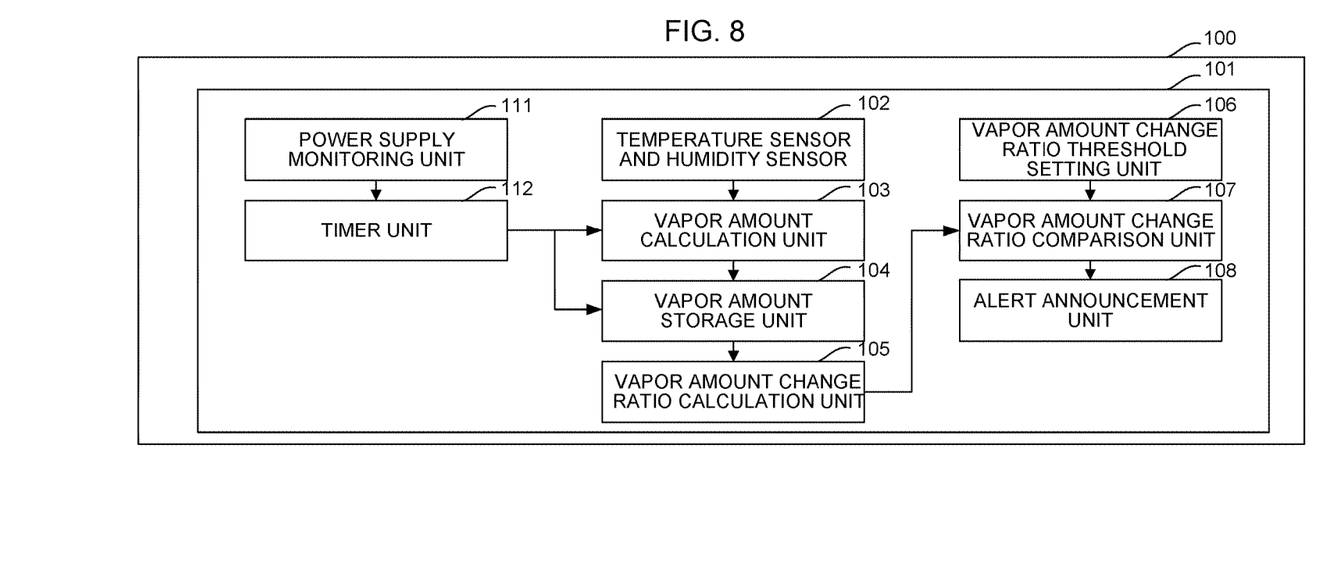
FIG. 8 is a block diagram showing the function configuration of a machine tool according to a third embodiment of the present invention.
Figure 9:
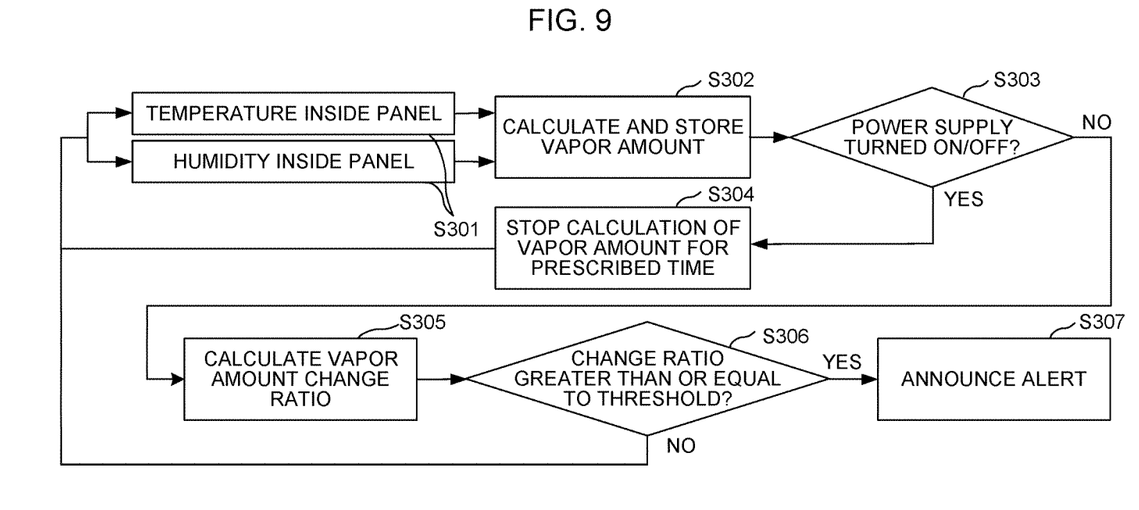
FIG. 9 is a flowchart for describing the operation of the machine tool of FIG. 8.

FIG. 8 is a block diagram showing the function configuration of a machine tool 100 according to the embodiment.

The distinctive feature of the embodiment is that the machine tool 100 has a power supply monitoring unit 111 and a timer unit 112, and the remaining configurations of the machine tool 100 of the embodiment are the same as those of the first embodiment (FIG. 1).

The power supply monitoring unit 111 detects whether the power supply of the machine tool 100 has been turned ON/OFF. Then, when the power supply monitoring unit 111 detects that the ON/OFF state of the power supply has been switched, the timer unit 112 temporarily stops the operation of a vapor amount calculation unit 103 and the operation a vapor amount storage unit 104, and counts up a time until the operations resume.

A description will be given, with reference to the flow-chart of FIG. 9, of the operation of the machine tool 100 according to the embodiment.

As in the first embodiment, a temperature sensor and a humidity sensor 102 measure temperature and humidity inside a control panel 101, respectively (step S301), and then a vapor amount calculation unit 103 calculates a vapor amount based on the measured temperature and the humidity (step S302).

The power supply monitoring unit 111 detects whether the power supply of the machine tool 100 has been turned ON/OFF (step S303). When the power supply has been turned ON/OFF, the timer unit 112 temporarily stops the operation of the vapor amount calculation unit 103 and the operation of the vapor amount storage unit 104. In addition, the timer unit 112 counts up the elapse of a prescribed time. Upon completing the counting, the timer unit 112 resumes the operations of the vapor amount calculation unit 103 and the vapor amount storage unit 104.

Figure 10:
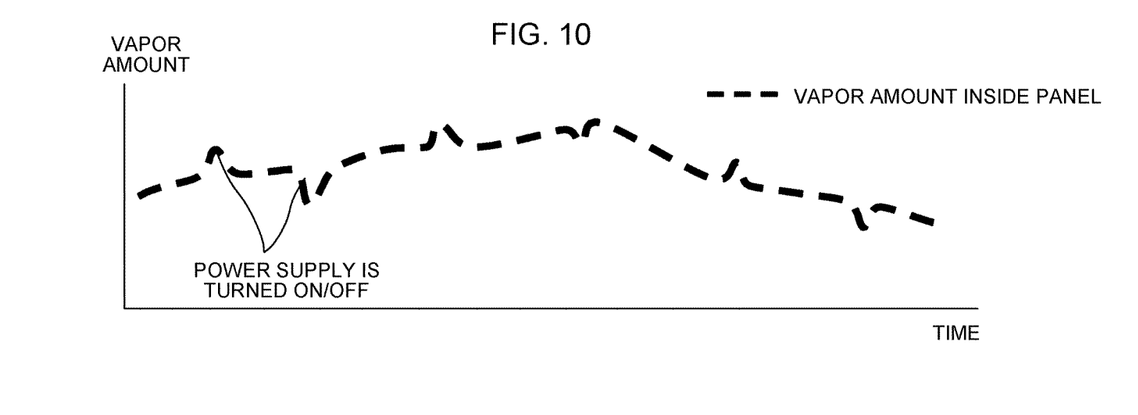
FIG. 10 is a diagram for describing the fact that the heating of electrical components inside a panel becomes transient and temperature and humidity inside the panel also become transient when the power supply of the machine tool is turned ON/OFF, which results in fluctuations in the calculated value of a vapor amount.

When the power supply of the machine tool 100 has been turned ON/OFF (YES in step S303), the heating of electrical components inside the panel becomes transient and temperature and humidity inside the panel also become transient. At this time, there is a likelihood that the calculated value of a vapor amount fluctuates as shown in FIG. 10, which causes a reason for the false determination of a sealing state. Therefore, the timer unit 112 stops the calculation and the storage of a vapor amount for a prescribed time after the power supply of the machine tool 100 has been turned ON/OFF to prevent the false determination (step S304).

On the other hand, when the power supply of the machine tool 100 has not been turned ON/OFF (NO in step S303), a vapor amount change ratio calculation unit 105 calculates a vapor amount change ratio as in the first embodiment (step S305). Then, a vapor amount change ratio comparison unit 107 determines whether or not the calculated vapor amount change ratio is greater than or equal to a threshold that is set in advance (step S306). When the calculated vapor amount change ratio is greater than or equal to the threshold, an alert announcement unit 108 announces an alert (step S307).

Here, when the timer operates in step S304, both the vapor amount change ratio calculation unit 105 and the vapor amount change ratio comparison unit 107 stop their operations for a prescribed time. Thus, since it is not determined that the sealing state of the control panel 101 has been impaired, the announcement of an alert is prevented.

According to the embodiment, the timer unit 112 temporarily stops the operation of the vapor amount calculation unit 103 and the operation of the vapor amount storage unit 104 when the power supply monitoring unit 111 detects that the power supply of the machine tool 100 has been turned ON/OFF. Thus, since it is possible to distinguish a case in which the calculated value of a vapor amount has been fluctuated due to the turning ON/OFF of the power supply from a case in which the sealing state has been impaired due to any other reasons, a false determination is prevented.

Note that the present invention is not limited to the above embodiments but is allowed to make alterations such as the replacement, omission, addition, and exchanging of the order of constituents without departing from its scope. For example, each of the second and third embodiments discloses the configuration in which the operation of the vapor amount calculation unit 103 is temporarily stopped to prevent a false determination. However, the operation of the temperature sensor and the humidity sensor 102, the vapor amount change ratio comparison unit 107, the alert announcement unit 108 or the like may be temporarily stopped to obtain the same effects, instead of the vapor amount calculation unit 103.

The invention claimed is:

1. A machine tool, comprising:
    a control panel;
    a temperature sensor and a humidity sensor that measure temperature and humidity inside the control panel, respectively;
    a vapor amount calculation unit that calculates a vapor amount based on the temperature and the humidity;
    a vapor amount storage unit that stores the vapor amount;
    a vapor amount change ratio calculation unit that calculates a vapor amount change ratio based on the vapor amount calculated by the vapor amount calculation unit and the vapor amount stored in the vapor amount storage unit;
    a vapor amount change ratio threshold setting unit that retains a threshold that is set in advance;
    a vapor amount change ratio comparison unit that determines whether or not the vapor amount change ratio is greater than or equal to the threshold; and
    an alert announcement unit that announces an alert when the vapor amount change ratio is greater than or equal to the threshold,
    wherein
    the vapor amount change ratio calculation unit calculates the vapor amount change ratio using an average of the vapor amounts per prescribed time instead of the vapor amounts.

2. A machine tool, comprising:
    a control panel;

a temperature sensor and a humidity sensor that measure temperature and humidity inside the control panel, respectively;

a vapor amount calculation unit that calculates a vapor amount based on the temperature and the humidity;

a vapor amount storage unit that stores the vapor amount;

a vapor amount change ratio calculation unit that calculates a vapor amount change ratio based on the vapor amount calculated by the vapor amount calculation unit and the vapor amount stored in the vapor amount storage unit;

a vapor amount change ratio threshold setting unit that retains a threshold that is set in advance;

a vapor amount change ratio comparison unit that determines whether or not the vapor amount change ratio is greater than or equal to the threshold;

an alert announcement unit that announces an alert when the vapor amount change ratio is greater than or equal to the threshold;

a door opening/closing detection unit that detects whether a door of the control panel is opened; and a vapor amount resetting unit that temporarily stops the operation of the vapor amount calculation unit to reset a content stored in the vapor amount storage unit when the opening of the door is detected.

3. A machine tool, comprising:

a control panel;

a temperature sensor and a humidity sensor that measure temperature and humidity inside the control panel, respectively;

a vapor amount calculation unit that calculates a vapor amount based on the temperature and the humidity;

a vapor amount storage unit that stores the vapor amount;

a vapor amount change ratio calculation unit that calculates a vapor amount change ratio based on the vapor amount calculated by the vapor amount calculation unit and the vapor amount stored in the vapor amount storage unit;

a vapor amount change ratio threshold setting unit that retains a threshold that is set in advance;

a vapor amount change ratio comparison unit that determines whether or not the vapor amount change ratio is greater than or equal to the threshold;

an alert announcement unit that announces an alert when the vapor amount change ratio is greater than or equal to the threshold; and a power supply monitoring unit that detects whether a power supply of the machine tool is turned ON/OFF, wherein the operation of the vapor amount calculation unit is stopped for a prescribed time when the power supply monitoring unit detects that the power supply is turned ON.

4. The machine tool according to claim 3, wherein the operation of the vapor amount calculation unit is stopped for the prescribed time when the power supply monitoring unit detects that the power supply is turned OFF.

5. The machine tool according to claim 1, wherein the vapor amount calculated based on the temperature and the humidity is the vapor amount inside the control panel.

\* \* \* \* \*